May 9, 1950 H. M. BAYARD ET AL 2,507,191

ANTIDISTORTING AND RETARDING DEVICE FOR SIGNAL TRANSMISSIONS

Filed May 22, 1945 2 Sheets-Sheet 1

INVENTOR
HONORÉ MARCEL BAYARD &
RAYMOND JACQUES CHARLES ROQUET
BY Alva D. Adams
Attorney May 9, 1950 H. M. BAYARD ET AL 2,507,191

ANTIDISTORTING AND RETARDING DEVICE FOR SIGNAL TRANSMISSIONS

Filed May 22, 1945 2 Sheets-Sheet 2

INVENTOR

HONORÉ MARCEL BAYARD &
RAYMOND JACQUES CHARLES ROQUET

BY Alva D. Adams

Attorney

Patented May 9, 1950

2,507,191

UNITED STATES PATENT OFFICE 2,507,191

ANTIDISTORTING AND RETARDING DEVICE FOR SIGNAL TRANSMISSION

Honoré Marcel Bayard, Meudon, and Raymond Jacques Charles Roquet, Clamart, France Application May 22, 1945, Serial No. 595,234
In France July 6, 1944

4 Claims. (Cl. 178—74)

The present invention relates to signal transmission and has for its primary object to improve the operation of a telegraph receiver operating electromagnetically, electrodynamically, electronically, or otherwise.

Another object of the present invention is to provide delayed operation of the electromagnetic, electrodynamic, or electronic relay, or an electromagnet, and more generally of any device actuated by an electric current in proportional or substantially proportional manner.

A further object of the present invention is to provide a method of reducing the characteristic distortion of a telegraph signal modulation received from a transmitting line or channel.

A still further object of the present invention is to provide a device for carrying this method into practice, and reducing distortion while producing a retarding effect which practically may reach the duration of the elementary interval of a signal to be relayed without introducing appreciable distortion.

With these and such other objects in view as will incidentally appear hereafter, the present invention comprises the novel steps and elements or combinations of elements that will now be described with reference to the accompanying drawings illustrating the present invention.

Figure 1:
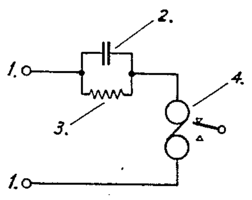
Fig:1. PRIOR ART
Figure 1 is a circuit diagram showing a known form of connection of the prior art for improving the keying curve of a telegraph current as a function of time, as received at one end of a transmission line.

Referring to the procedures heretofore employed, as shown in Figure 1, it is known that a customary method, as heretofore used for improving the keying curve of the telegraph current received at the receiving end of a telegraph transmission line such as 1, consists in inserting into the receiver circuit a condenser 2 bridged by a resistance shunt 3. In this receiver, 4 designates the actuating windings or the input element for the electromagnetic relay or other amplifying receiving unit providing for signal reception or playing a similar part.

The shape of the transition curve 5 (Fig. 2), in the resistor 3 (Fig. 1), i. e., of the curve whose ordinators represent the ratio of the transient value of the current to the permanent operating value and whose abscissas are elapsed time, does not differ widely from that of the transient value of the current in a cable not provided with a shunted condenser. However, the transition curve of the transient value of the current in the condenser 2 (the curve designated by 6 in Fig. 2), has ordinates which are proportional to the time derivative of the function represented by the curve 5 for resistor 3. The sum of the ordinates of the two curves which gives the transition curve 7 (Fig. 2) in the receiver, shows, subject to proper selection of values, a much steeper rise than the curve 5. Nevertheless, such rise results almost exclusively from the current increase in the condenser because the current through the resistor then varies only very slowly, generally speaking, as the current through the condenser increases.

Figure 2:
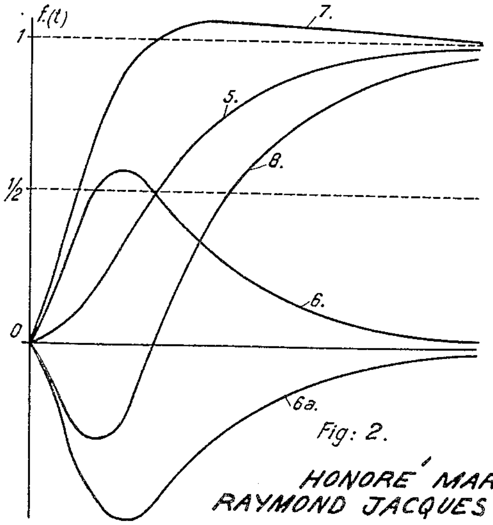
Figure 2 is a set of keyed current curves as a function of time showing the results attained by the present invention compared with those of the prior art.

The expression "effective transition curve" will be used hereafter to designate the transition curve of the input delivered to the receiver. Thus, for example, when dealing with the shunted condenser of Fig. 1, the curve 7 shown in Fig. 2 is the effective transition curve for the received signal.

As a particular instance, in the case of an electromagnetic receiver such as a polarized relay which employs several windings, the determining parameter is the magnetic field which exists in the armature gaps. It is proportional or substantially proportional to the algebraic sum of the currents flowing through the several windings. Likewise, when dealing with a receiver including several tubes, each of which has one or more grids, the determining parameter which defines the transition curve is the electron stream which reaches the anode.

For the sake of simplicity in the following, it will now be assumed that the receiver device is a polarized relay adjusted to neutrality and having perfect operation, or the equivalent, and, moreover, that the modulation or signal is bivalent and has a full emission. That is, the keying method employs two active positions as in the Morse system, and full emission. The emission used is full, that is, each individual signal element is unvarying direct current throughout the duration of each signal element, as distinguished from systems having "fragmented" emission in which current is transmitted during only a fraction of the duration of the signal element. Under this assumption, the relay operates at the intersection of the horizontal line representing ordinate ½ (Fig. 2) and the effective transition curve.

It is a well known fact that the effective transition curve should rise as steeply as possible, or, in other words, the speed of effective transition which is readily derived therefrom as the time derivative thereof, should be as large as possible.

In accordance with the method proposed by the present invention, currents through resistor 3 and condenser 2 (Fig. 1), represented for the circuit of Fig. 1 by the curves 5 and 6 in Fig. 2, are caused to act in opposite directions. Thus, for example, there is thus obtained instead of the curve 6, a curve 6a (Fig. 2), while the resulting effective transition curve representing the current which is the resultant of the current through resistor 3 and condenser 2, is the curve 8 in Fig. 2, being the sum of curve 5 and curve 6a.

By proper selection of resistance and capacity values, a quicker transition is obtained than with the resistor alone and even than with the connection shown in Fig. 1.

This opposing effect may be secured between the current which flows through the condenser and the current which flows through the resistor, for completely utilizing a differential network, and such a connection as will bring the effects of these two currents into opposition. Such a differential network will make the current in receiver 4 the difference between the current which has passed through the resistances and the current which has passed through the condensers.

Figure 3:
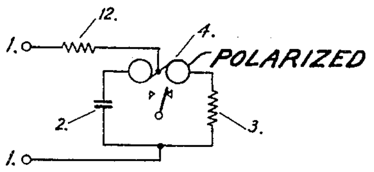
Figures 3 to 7 are circuits similar to Figure 1 showing how the present invention may be applied to a system as shown in Figure 1 for improving the operation.

The circuit shown in Fig. 3 illustrates such a connection which provides such opposition. Elements corresponding to those shown in Fig. 1 bear the same reference numerals, but their arrangement is different, and an additional resistor 12 is provided.

Figure 4:
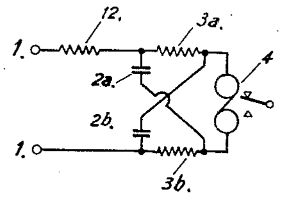

A lattice type of connecting system, such as the one shown in Fig. 4, can also be employed. It includes a pair of condensers 2a and 2b, and a pair of resistors 3a and 3b interconnected in criss-cross fashion.

Owing to the provision of the condenser and to the relay inductance (including the mutual inductance of the windings in the embodiment shown in Fig. 3), the system constituted as above described, is a strongly damped oscillating circuit. Practical experience using receivers including a galvanometer coil frame has shown that an advantage may be gained from arranging the actual cycle of receiver vibrations to be substantially equal to the cycle of current reversals, or at least that such should be the case during the first half vibration or oscillation. This calls for a fairly strong damping action.

According to the present method, the particular feature is adopted so to select the values of circuit elements of the relay local circuit as to adjust the duration of the first half cycle to equality with the duration of the elementary signal of the telegraph signal modulation.

Figure 5:
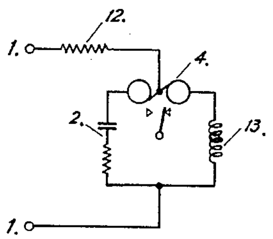

For that purpose, the connecting system according to the showing of Fig. 3, may be further improved by suitably incorporating either together or separately, resistors, capacitances, and self-inductances, whose values require adjustment to provide the desired effect. Thus, for example, the connection shown in Fig. 3 may be changed by substituting a choke coil 13 for the resistor 3 (Fig. 5).

Figure 6:
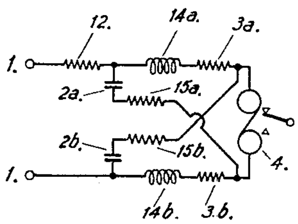

The same improvement can be introduced into the other possible manners of connection. In Fig. 6, is shown, for example, a connecting system representing a further improvement over that shown in Fig. 4, and including additional choke coils 14a and 14b and resistors 15a and 15b.

Where the relay includes more than one pair of windings, and where a connecting system for obtaining opposition similar to the one shown in Fig. 3 is used, windings may be provided in asymmetrical fashion, thereby altering the effective transition curve while increasing the capacitance or resistance or self-inductance effect.

Such an asymmetrical arrangement of windings may be attained by providing in the relay exciting windings, more turns in the capacitative circuit than in the resistance circuit, to increase the current passing through one winding and decrease the current passing through the other winding and emphasize the effect of capacitance. Different time characteristics are thus attained without changing the connected network units. Where a lattice type of connecting system is utilized, the legs of the system may be adjusted to be out of balance or unequal so as to increase the effect of capacitance or resistance or self-inductance.

Figure 7:
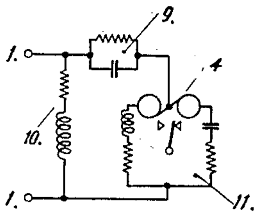

No matter what connecting system is adopted, it can be still further improved by introducing, either together, or separately, a shunted condenser and an inductive shunt in accordance with known practice, for the purpose of improving the transition function; that is, the time characteristic of the transient current before the steady state is attained, to improve the response characteristic of the circuit of the receiving relay to the voltage which is applied thereto. An example of carrying this scheme into practice is shown in Fig. 7, wherein 9 designates the shunted condenser, 10 is the inductive shunt, and 11 the differential local circuit; that is, the two-branch circuit connected to receiver 4, having inductance in one branch and capacitance in the other branch.

Where, instead of comprising an electromagnetic relay, the receiver device comprises an electronic tube circuit, the desired opposing effect may be secured, for example, by suitably biasing two different grids of one tube, or of different tubes, by the current from the respective legs of the differential circuit shown in Fig. 3, or of an improved connecting system such as the one shown in Fig. 5. Alternatively, the criss-cross connecting system shown in Fig. 4, or an improved system such as the one shown in Fig. 6, can be used by substituting for the relay windings, the input device for a tube. The transmission from the self-inductance of the relay windings should, in such an event, be compensated by the insertion of an additional impedance network or by readjustment of the values of the circuit elements.

An examination of the resultant curve shown in Fig. 2, clearly brings out that the device according to the present invention introduces a very considerable retarding or lagging action in the operation of the receiving relay or equivalent element, while, on the contrary, the shunted condenser device connected as shown in Fig. 1, which provides the effective transition curve 7 shown in Fig. 2, involves an advance with respect to the operation which would be obtained without the condenser (curve 5 in Fig. 2); that is to say, substantially where the cable is used alone without adjusting the terminal equipment.

The type of retarding action thus produced by the device according to the present invention, is a marked advantage since it can be adjusted. The adjustment which will give the device the advantages which are the purpose of the present invention, should produce, when the device is connected to the telegraph line, an effective transition curve having the characteristics shown in Fig. 8, the elapsed time *Op* being approximately equal to the time of the elementary signal modulation internal, while the interval *pm* where *m* corresponds to the maximum M of the curve, is approximately equal to *Op*.

Figure 9:
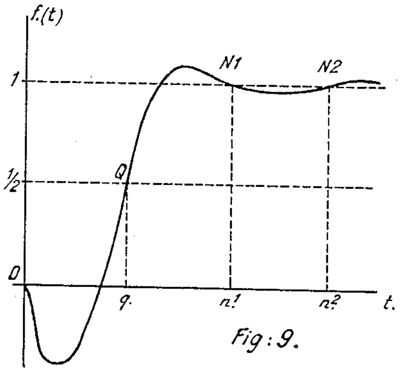

Better still, the intervals *Oq*, *qn1*, *n1*, *n2*, etc., may be made approximately equal to that of the elementary signal modulation interval; that is, the positive and negative code character elements (five for a character in the International Code), giving a resultant curve shown in Fig. 9.

Figure 8:
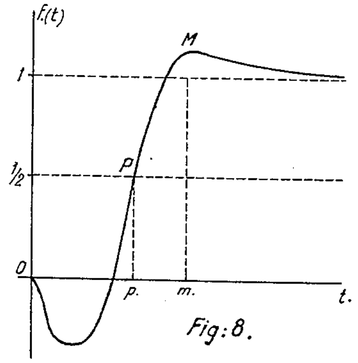
Figures 8 to 10 show further curves setting forth the results attained by the present invention.

From fundamental theoretical consideration it is found that the residue of prior signal elements is zero at those instants when the relay or its equivalent circuit element operates, subject to the effective transition curve having any one of the shapes shown in Figs. 8 and 9.

Heretofore, commonly used connecting systems did not as a rule permit an effective transition curve being obtained which would pass through points P and M of Fig. 8, or points Q, $N_1$, $N_2$ of Fig. 9, because the transition curve produced thereby rises steeply immediately from its initial point.

In contradiction to this, the desired condition is obtained by connecting systems according to the present invention, whereby they have an anti-distorting action.

Proper reception of signals may be effected as desired by the method according to the present invention, while such signals are transmitted at the other end of the telegraph transmission line concurrently through the signal pre-correcting device described in applicants' copending application Ser. No. 593,164, filed May 11, 1945, now abandoned and application Ser. No. 75,152, filed Feb. 8, 1949, these devices being adapted to eliminate characteristic line distortion, or through an equivalent pre-correcting device. The characteristic distortion of a line is the distortion experienced on this line in the absence of all extraneous disturbances, such as those due to adjacent lines, and earth currents. Operating members both at the transmitting end and at the receiving end of the telegraph line should be correspondingly adjusted.

The delayed operation of a relay results from the shape of the effective transition curve. Where in particular, a relay 4, or an equivalent device, is to be controlled locally and with a lagging action, any one of the connecting systems which can be used for reducing distortion, may be employed, for example, those shown in Figs. 3, 4, 5, or 6, wherein the local control circuit replaces the transmission line or cable. This local control circuit includes a local voltage source situated near the relay, and circuit interrupting devices inserted in the circuit between the local source and the relay.

The retarding action is dependent upon the elements of which the connecting system is made up, namely, the resistors, capacitances, self-inductances, sources of electric power, and the relay characteristics or qualities; that is, the mechanical characteristics of the relay, such as mechanical damping, and the self-inductance or other electrical characteristics of the relay windings.

By a proper selection of these elements, the retarding action may reach practically the duration of the elementary interval of the signal modulation to be re-transmitted, without introducing appreciable distortion.

An advantage will often be obtained, when trying to attain this result, by utilizing a relay having relatively low sensitivity.

Figure 10:
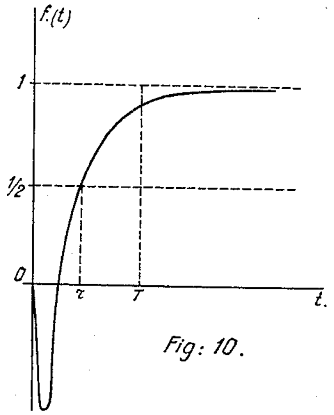

For example, when the retarding action desired is substantially less than the elementary interval of the signal modulation, a resultant signal modulation having practically no distortion, will be secured by so selecting the elements which make up the circuits as to impart to the effective transition curve a shape similar to the one shown in Fig. 10 wherein the abscissa *Or* represents the lag and the abscissa OT the duration of the elementary signal modulation interval.

By way of further example, where the retarding action desired is of the order of the duration of the elementary signal modulation interval without, however, exceeding this duration, an advantage will be gained, with a view to avoiding distortion of the signal modulation, by so selecting the values of the component circuit elements as to give to the effective transition curve a shape similar to any one of those shown in Figs. 8 and 9.

Finally, where the retarding action desired is greater than the elementary signal modulation interval, an advantage will be obtained by using a pair or a larger number of relays arranged in cascade or echelon arrangement. The delayed operation of an electromagnet, an electronic, or an electrodynamic relay, or other equivalent device, may be obtained by the same method.

It will be apparent to those skilled in the art that our invention is susceptible of modifications to adapt the same to particular applications, and all such modifications which are within the scope of the appended claims we consider to be comprehended within the spirit of our invention.

What is claimed is:

1. In a high-speed telegraph receiving station, a receiving device comprising a telegraph relay having an actuating winding adapted for electrical actuation by an applied signal, line and return terminals and connections between the actuating winding of said device and said respective terminals, and comprising a four-leg cross-connected bridge network unit having two opposite legs which comprise capacitance and whose two other opposite legs comprise impedance selected from the group consisting of resistance and inductance.

2. In a high-speed telegraph receiving station, a receiving device comprising a telegraph relay having an actuating winding adapted for electrical actuation by an applied signal, line and return terminals, and connections between the actuating winding of said device and said respective terminals and comprising a four-leg cross-connected bridge network unit having two opposite legs which comprise capacitance and whose two other opposite legs comprise inductance and resistance.

3. In a telegraph receiving circuit, a two-wire transmission line, a relay comprising at least one actuating winding, a first resistance connected in series between the first wire of said transmission line and a first terminal of the winding of said relay, a second resistance connected in series between the second wire of said transmission line and a second terminal of the winding of said relay, a first substantially pure capacitive path consisting of a first condenser connected between the first wire of the transmission line and the second terminal of the winding of said relay, and a second substantially pure capacitive path consisting of a second condenser connected between the second wire of said transmission line and the first terminal of the winding of said relay.

4. In a telegraph receiving circuit, a two-wire transmission line, a relay comprising at least one actuating winding, a first inductance and a first resistance connected in series between the first wire of said transmission line and a first terminal of said relay winding, a second inductance and a second resistance connected in series between the second wire of the transmission line and the second terminal of said relay winding, a first condenser and a third resistance connected in series between the first wire of said transmission line and the second terminal of said relay winding, and a second condenser and a fourth resistance connected in series between the second wire of said transmission line and the first terminal of said relay winding.

HONORÉ MARCEL BAYARD.
RAYMOND JACQUES CHARLES ROQUET.

REFERENCES CITED

The following references are of record in the file of this patent:

UNITED STATES PATENTS

| Number | Name | Date |
|---|---|---|
| 711,943 | Crehore | Oct. 28, 1902 |
| 888,509 | Kitsee | May 26, 1908 |
| 1,766,919 | Milnor | June 24, 1930 |
| 1,804,547 | Shanck | May 12, 1931 |
| 1,917,885 | Hearn | July 11, 1933 |
| 2,146,824 | Kinkead | Feb. 14, 1939 |
| 2,174,221 | Cramer | Sept. 26, 1939 |